US008190619B2

(12) United States Patent
Lehtipalo et al.

(10) Patent No.: US 8,190,619 B2
(45) Date of Patent: May 29, 2012

(54) MULTI-SOURCE DATA VISUALIZATION SYSTEM

(75) Inventors: Tobias Lehtipalo, Västra Frölunda (SE);
Johan Thoresson, Göteborg (SE);
Tommy Fortes, Göteborg (SE); Daniel Vulcan, Göteborg (SE)

(73) Assignee: Spotfire AB, Gothenburg (SE)

( * ) Notice: Subject to any disclaimer, the term of this patent is extended or adjusted under 35 U.S.C. 154(b) by 323 days.

(21) Appl. No.: 11/824,471

(22) Filed: Jun. 29, 2007

(65) Prior Publication Data
US 2009/0006318 A1     Jan. 1, 2009

(51) Int. Cl.
*G06F 17/30* (2006.01)
(52) U.S. Cl. .......................... 707/754; 707/759
(58) Field of Classification Search .................. 707/754, 707/759, 999.006, 999.107
See application file for complete search history.

(56) References Cited

U.S. PATENT DOCUMENTS

| | | | |
|---|---|---|---|
| 6,768,987 B1 * | 7/2004 | Couch et al. ........................... 1/1 |
| 7,559,023 B2 * | 7/2009 | Hays et al. ..................... 715/255 |
| 2002/0070953 A1 * | 6/2002 | Barg et al. ...................... 345/700 |
| 2004/0168115 A1 * | 8/2004 | Bauernschmidt et al. ..... 715/500 |
| 2004/0236620 A1 * | 11/2004 | Chauhan et al. ................... 705/9 |
| 2006/0112123 A1 * | 5/2006 | Clark et al. ..................... 707/101 |
| 2007/0239508 A1 * | 10/2007 | Fazal et al. ......................... 705/8 |
| 2008/0288889 A1 * | 11/2008 | Hunt et al. ..................... 715/810 |
| 2009/0006323 A1 * | 1/2009 | Deardorff et al. ................. 707/3 |
| 2011/0035744 A1 * | 2/2011 | Bhatia ........................... 717/174 |

* cited by examiner

*Primary Examiner* — Leslie Wong
(74) *Attorney, Agent, or Firm* — Kristopher E. Elbing

(57) ABSTRACT

In one general aspect, the application discloses a data visualization method in which at least two retrieved data tables are associated based on a selection of at least one common field. A visualization is displayed for data from a first of the tables and input for query devices is received to filter data for a second of the tables. The displayed visualization for the first table can then be updated in response to the received query device input for the second table based on the created association.

21 Claims, 11 Drawing Sheets

FIG. 3

| Import Settings | | | | | |
|---|---|---|---|---|---|
| Separator Character ● Tab ○ Comma ○ Semicolon ○ Space ○ Other: | Format Culture [▼] Encoding [▼] | | | | Advanced Refresh |
| Name | Record No | Order Priority | Sales Total | Discount | Ship Met |
| Type | Integer | String | Real | Real | String |
| Included | ☑ | ☑ | ☑ | ☑ | |
| Name row | Record No | Order Priority | Sales Total | Discount | Ship Met |
| Data row | 7081 | 2-HIGH | 227.6 | 0 | REGULA |
| Data row | 7082 | 3-MEDIUM | 99.81 | 0.12 | REGULA |
| Data row | 7083 | 3-MEDIUM | 51.62 | 0.1 | REGULA |
| Data row | 7084 | 3-MEDIUM | 32.89 | 0.02 | REGULA |
| Data row | 7085 | 5-LOW | 83.75 | 0.09 | REGULA |
| Data row | 7086 | 1-URGENT | 13.02 | 0.07 | REGULA |
| Data row | 7087 | 1-URGENT | 289.89 | 0.01 | REGULA |
| Help | | | | OK | Cancel |

MULTI-SOURCE DATA VISUALIZATION SYSTEM

FIELD OF THE INVENTION

This invention relates to the field of data visualization, including the design of data visualization systems.

BACKGROUND OF THE INVENTION

The modern world is seemingly flooded with data but is often at a loss for interpreting it. One exceptionally useful tool that has found wide acceptance is software that presents the data in some visual form, especially in a way that makes relationships noticeable. Using this software, often very complex databases can be queried. The results of the queries are then analyzed and displayed in some visual format, usually graphical, such as a bar or pie chart, scatter plot, or any of a large number of other well-known formats. Modern analysis tools then allow the user to dynamically adjust the ranges of the displayed results in order to change and see different aspects of the analysis.

One prominent data visualization product is owned by Spotfire AB of Goteborg, Sweden, and marketed under the name DecisionSite.® In this product, which incorporates the technology disclosed in U.S. Pat. No. 6,014,661, query devices tied to columns in the data set and different visualizations of the data allow users to dynamically filter their data sets based on any available property, and hence to interactively visualize the data. As the user adjusts graphical query devices such as rangesliders and alphasliders, the DecisionSite product changes the visualization of the data accordingly.

The DecisionSite product also includes several other automatic features, such as initial selection of suitable query devices and determination of ranges, which aid the user not only to visualize the data, but also to mine it. When properly used, this technique constitutes a powerful tool that forms the basis for sophisticated data exploration and decisionmaking applications.

Overall, visualization products have improved the efficiency and enhanced the capabilities of professionals in a wide range of areas of data analysis. But these individuals are typically highly trained and highly paid, and they can still spend long periods of time in their data analysis tasks. Improvements in capabilities of data visualization tools could therefore bring further improvements to the efficiency and quality of tasks performed by individuals working in a variety of fields.

SUMMARY OF THE INVENTION

In one general aspect, the invention features a data visualization system that includes multi-source record access logic that is operative to access records belonging to first and second data sources. The system also includes query device presentation logic that can present query devices that correspond to fields from the accessed records. Further included are combined visualization logic that is operative to display visualizations corresponding to records accessed in the data sources, and common record association logic is operative to associate one or more fields in the first data source with one or more fields in the second data source. The visualizations are also responsive to filtering functions defined by the query devices, In preferred embodiments, the query device presentation logic can present a common query device for common fields associated by the common record association logic. The combined visualization logic can be responsive to a mode selection to select different methods of filtering data for common fields associated by the common record association logic. The different methods of filtering can include exclude filtered out rows, include filtered rows only, and ignore filtering. The record association logic can present an association control to the user in response to a user request to open more than one data source for a single visualization. The multi-source record access logic, query device presentation logic, and combined visualization logic can present different grouped visualizations that each operate on different sets of two or more different data sources. The combined visualization logic can display the tables and visualizations in a single unified presentation area. The combined visualization logic can present a data source selection control associated with the visualizations. The combined visualization logic can display one or more interactive elements in one visualization that are responsive to user interaction to affect the display of one or more visual elements in another visualization. The record access logic can access differently formatted data sets and enable the query device presentation logic and combined visualization logic to operate on the differently formatted data sets. The system can further include save logic operative to save the visualizations. The system can further include record consolidation logic operative to consolidate records from the first data source with records from the second data source. The multi-source record access logic can present a source addition control to the user. The visualizations for associated tables can be controlled by a same set of grouped query devices.

In another general aspect, the invention features a data visualization method that includes retrieving a plurality of data tables, associating at least two of the data tables based on a selection of at least one common field, displaying a visualization for data from a first of the tables, receiving input for query devices to filter data for a second of the tables, and updating the displayed visualization for the first of the tables in response to the received query device input for the second of the tables based on an association created in the step of associating.

In a further general aspect, the invention features a data visualization system that includes means for retrieving a plurality of data tables, means for associating at least two of the data tables based on a selection of at least one common field, means for displaying a visualization for data from a first of the tables, means for receiving input for query devices to filter data for a second of the tables, and means for updating the displayed visualization for the first of the tables in response to the received query device input for the second of the tables based on an association created by the means for associating.

In another general aspect, the invention features a data visualization system that includes multi-source record access logic that is operative to access records belonging to first and second data sources. The system also includes query device presentation logic operative to present a unified group of a plurality of query devices that are responsive to user interaction, with at least some of the query devices corresponding to a field from the first set and at least some of the query devices corresponding to fields from the second set. Further included is combined visualization logic that is operative to display visualizations corresponding to records accessed in the first and second data sources. The visualizations are also responsive to filtering functions defined by the query devices. In preferred embodiments, the combined visualization logic can display the visualizations and the tables on a single unified page.

In a further general aspect, the invention features a data visualization method that includes retrieving a plurality of data tables, displaying visualizations for the plurality of tables, presenting a unified group of query devices for fields in each of the plurality of tables, and updating the displayed visualizations based on input received by the query devices.

In another general aspect, the invention features a data visualization system that includes means for retrieving a plurality of data tables, means for displaying visualizations for the plurality of tables, means for presenting a unified group of query devices for fields in each of the plurality of tables, and means for updating the displayed visualizations based on input received by the query devices.

Systems according to the invention can allow users to easily retrieve and visualize data from different data sets, even if they are differently formatted files located in different places. This helps the user to quickly begin working with the data in the files without first having to consolidate them, or even without knowing much about the structure of the files at all. The result is that the user can be more efficient and can more fully focus on the task of interactively exploring the substantive information in the data, rather than being bogged down with formatting issues. This leads to a more immersive and interactive experience, which tends to foster a more intuitive and creative approach to problem solving.

In the course of exploring a database about sales, for example, a user might get the idea that some sales patterns seem to be related to weather patterns. To investigate this assumption, the user could quickly add a historical weather data set organized by zip code, and immediately begin exploring the interaction between the two tables. He or she could investigate the relationship between temperature and the purchase of bulky items, for example, or the effect of anticipated storms on sales generally. And because the user can simply add the table into an existing project, the interruption can be minimal, and the user therefore does not tend to lose his or her train of thought. Prior art systems, in contrast, may require the user to merge the two tables outside of the system before investigating data relationships, which can be time-consuming and interrupt the user's work flow.

BRIEF DESCRIPTION OF THE DRAWINGS

FIG. 3 is a screenshot of a visualization screen for the system of FIG. 1 for a preloaded illustrative customer list data set;

FIG. 6 is a screenshot of an import settings dialog for the system of FIG. 1;

FIG. 12 is a screenshot of the visualization screen for the system of FIG. 1 shown after a second illustrative sales table has been added to the preloaded illustrative customer list data set;

FIG. 13 is a screenshot of the visualization screen for the system of FIG. 1 shown after the second illustrative sales table has been added and showing a drop-down filtering effect mode menu;

DETAILED DESCRIPTION OF AN ILLUSTRATIVE EMBODIMENT

Figure 1:
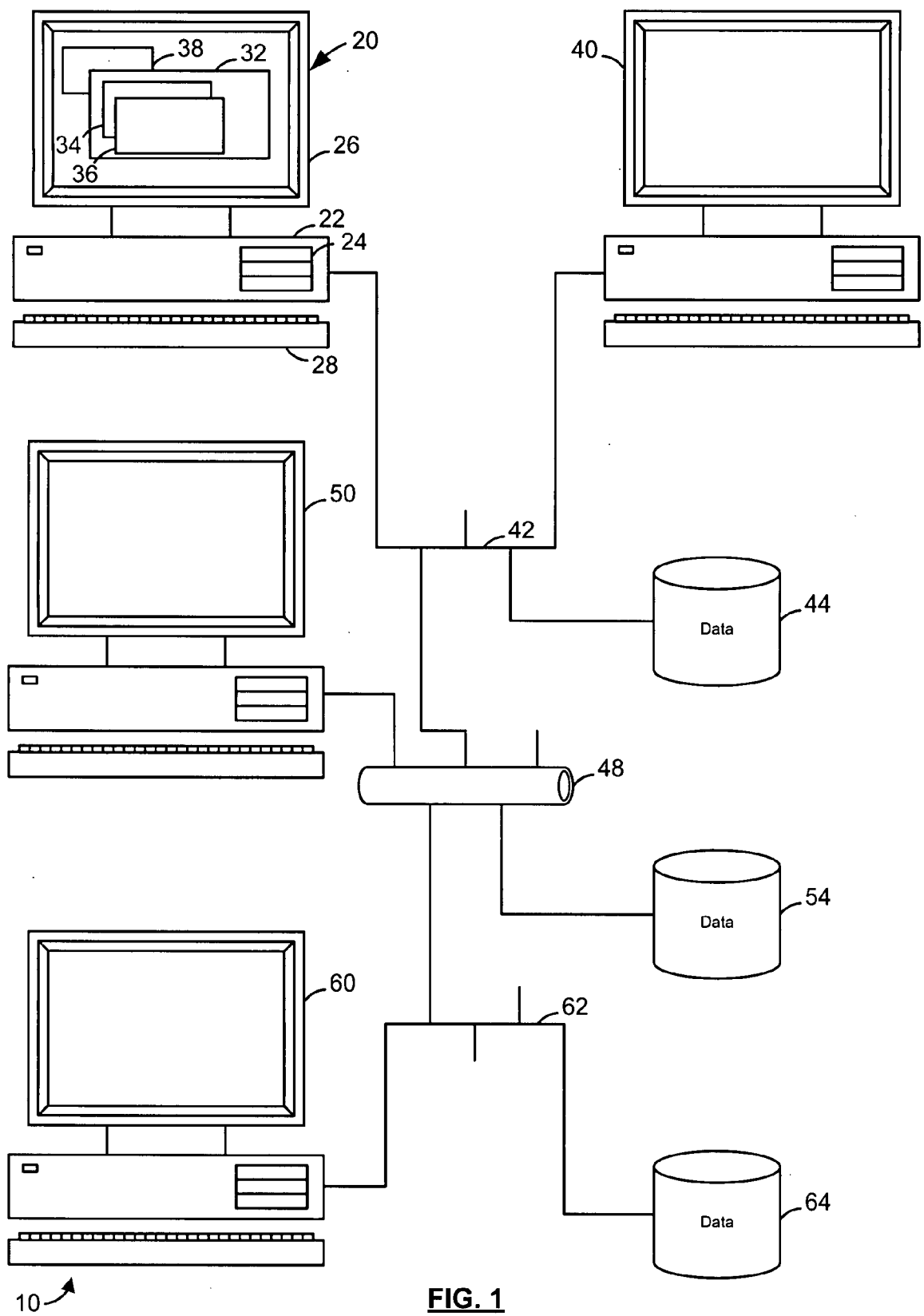
FIG. 1 is a block diagram showing an illustrative embodiment of a multi-source data visualization system according to the invention and its operating environment.

Referring to FIG. 1, an illustrative interactive data visualization system 10 according to the invention can run on one or more interacting platforms. In this embodiment, the system includes a first workstation 20, which comprises a processing unit 22, and storage 24. The storage includes high-speed storage, such as RAM, and mass storage, such as disk storage. The workstation also includes a display 26 and one or more input devices, including a keyboard 28 and a pointing device (e.g., a mouse). The workstation in this embodiment conforms to the so-called IBM-PC standard and is equipped with the well-known Microsoft Windows® operating system that enables its user to launch one or more application programs, although the system could also use other platforms, such as Apple McIntosh®, Linux®, or UNIX®-based platforms. Other types of platforms could also be supported, such as PDA's or mobile telephones.

The workstation 10 has access to a visualization application that can present one or more visualization application screens 32, 38 on its display. These visualization screens can each present one or more visualization windows 34, 36. And, as will be discussed in more detail below, the visualization windows can also be made up of two or more visualizations. Generally, the visualization program will be stored in and run from the workstation's mass storage.

The workstation also includes a network interface that allows it to be connected to other workstations (e.g., 40) and/or network storage 44 via a private Local Area Network (LAN) 42, such as an Ethernet® LAN. The private network is connected to a public network 48, such as the internet, which can be connected to other workstations (e.g., 50) and/or network storage (e.g., 44). Other private networks (e.g., 62) can be connected to the public network as well, and can include further workstations (e.g., 60) and/or network storage (e.g., 64). One of ordinary skill in the art will immediately recognize that an essentially unlimited number of combinations of workstations, storage, private networks, and public networks can be assembled, and that the system shown in FIG. 1 is simply one example of many possible implementations.

Figure 2:
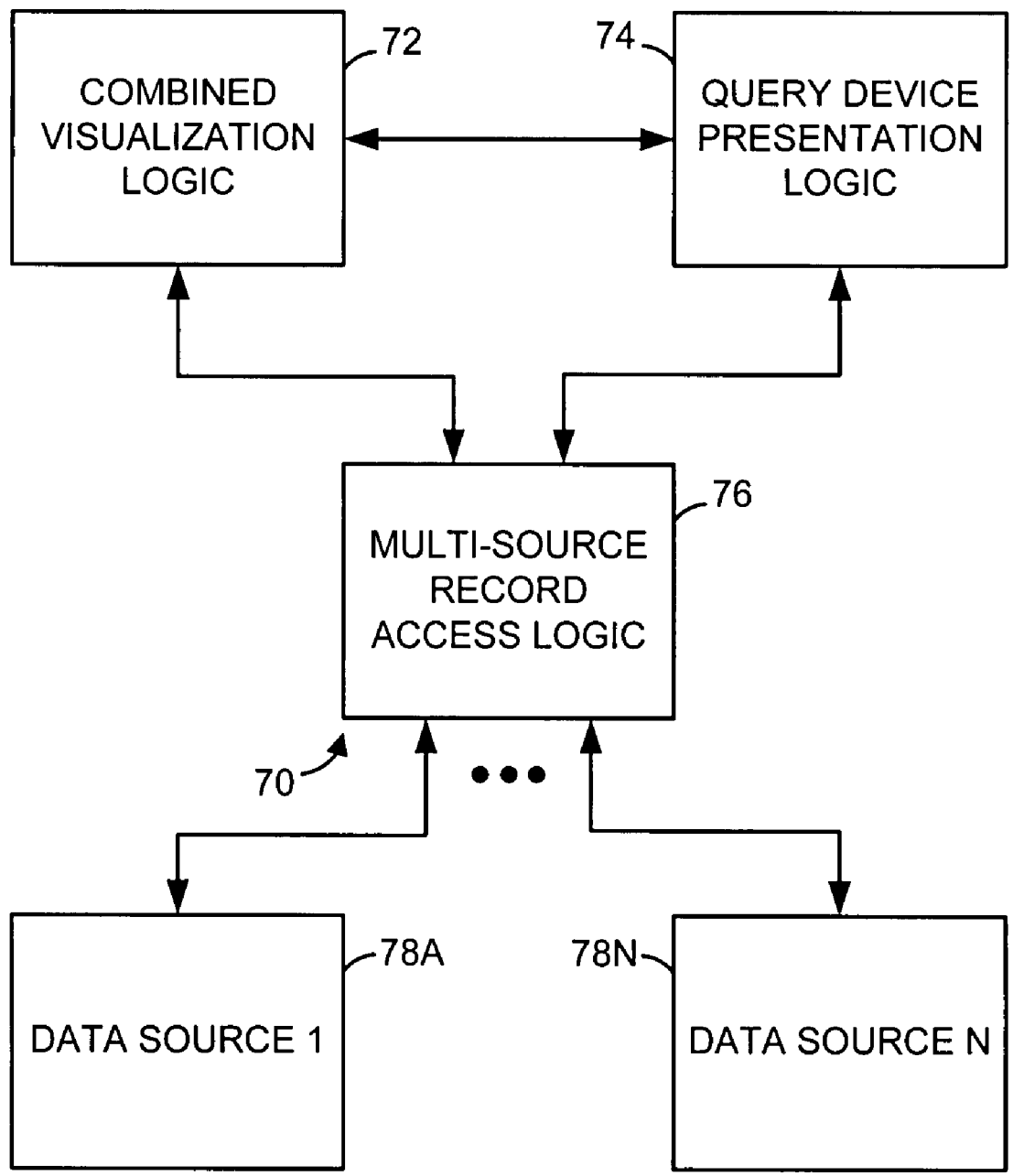
FIG. 2 is a block diagram of a multi-source visualization application for use with the system of FIG. 1.

Referring to FIG. 2, the visualization application 70 includes combined visualization logic 72, query device presentation logic 74, and multi-source record access logic 76. The combined visualization logic includes visualization presentation functionality, as described in more detail in U.S. Pat. No. 6,014,661, although it has been enhanced to allow the system to operate on data from multiple sources 78A...78N. The query device presentation logic includes query device presentation functionality that allows it to present query devices that apply filtering functions that determine what data are displayed in visualizations presented by the combined visualization logic, as described in more detail in U.S. Pat. No. 6,014,661.

Figure 3:
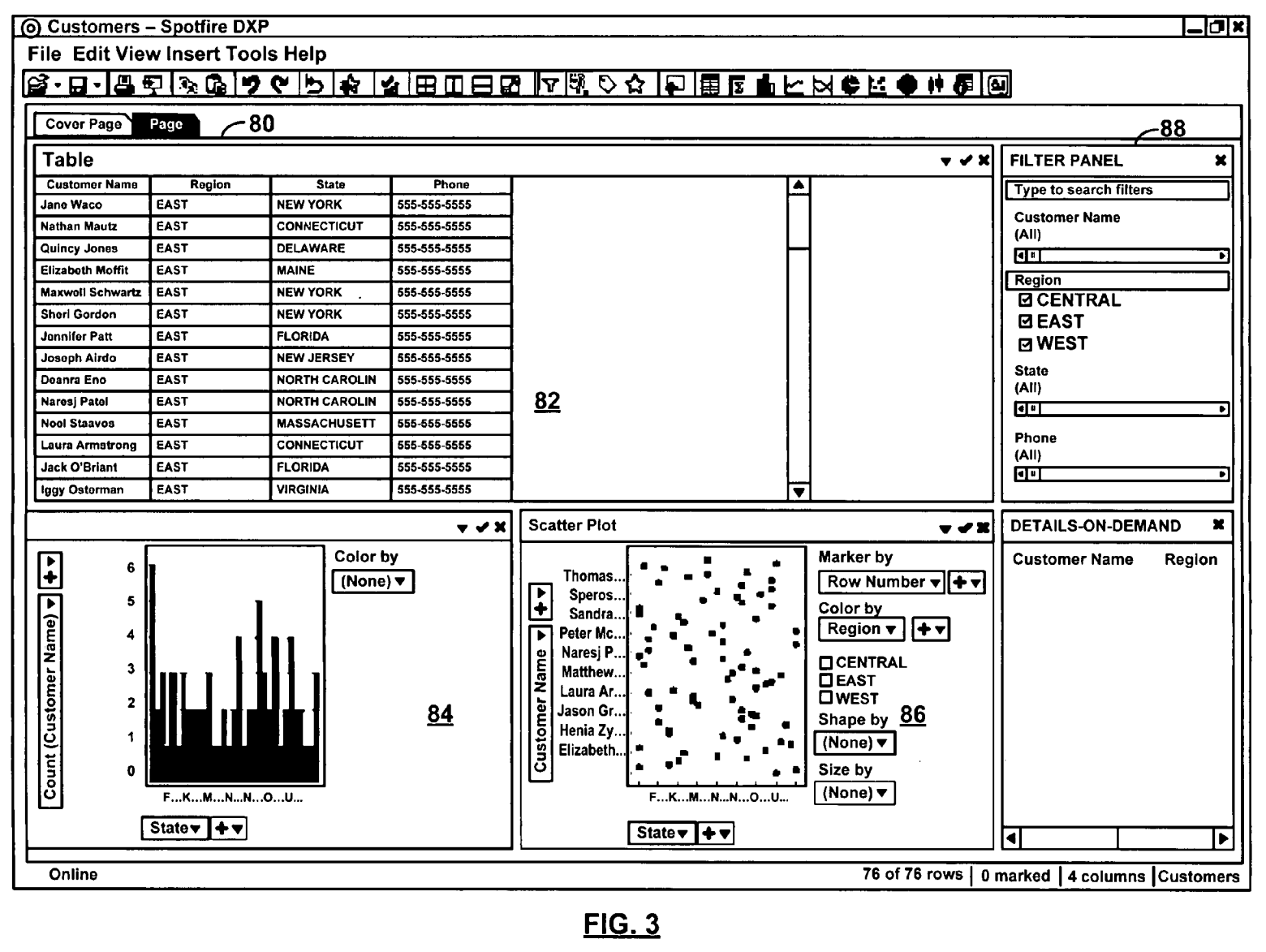

In operation, referring to FIG. 3, the visualization application 70 presents the user with the ability to create one or more visualization pages (e.g., 80) for a data set in a visualization window. A visualization page can include one or more visualizations, such as a data table 82, a histogram 84, and a scatter plot 86. A filter panel 88 allows the user to interactively select data to be shown in the visualization page. Deselecting the "East" checkbox in the filter panel, for example, would remove the records (rows) from the data table with a region field set to "East." It would also remove the bars and points for these records in the histogram and scatter plot.

Figure 4:
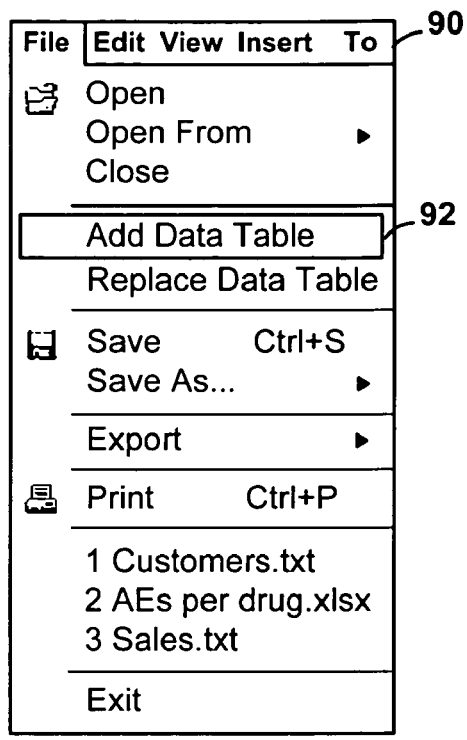
FIG. 4 is a screenshot of a file menu that includes an add table entry, for the system of FIG. 1.
Figure 5:
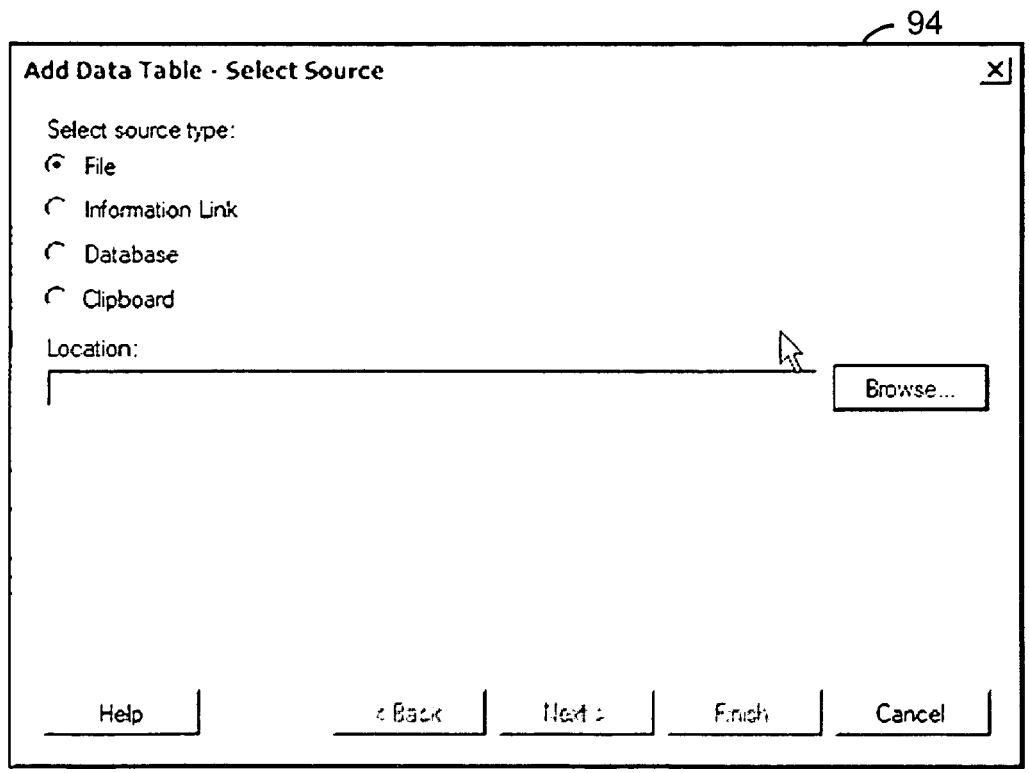
FIG. 5 is a screenshot of an add data table dialog for the system of FIG. 1.

Referring to FIG. 4, the visualization application provides a file menu 90 that includes an add table entry 92. When the user selects this entry, it causes the visualization application to present an add table dialog 94 (see FIG. 5). This add table dialog includes several source type selection radio buttons, such as "File," "Information link," "Database," and "Clipboard." It also includes a browse button and location text box.

The user can use the data type selection box, browse button, and text selection box to select a second data source. This data source can be of any of the types listed. And this type does not have to be the same as the type of the other table already loaded in the application.

Referring also to FIG. 1, the user can elect to retrieve the second data set from any of a variety of locations available to him or her. The data set can be retrieved from local storage 24 for the user's workstation 20, local storage associated with another user's workstation 40 on the LAN 42, or dedicated network storage 44 located on the LAN. It can also be retrieved from remote servers, workstations, or storage located on the public network 48 or on another remote LAN 62. After selecting a location for the second data set, the user actuates a "Next" button.

Figure 7:
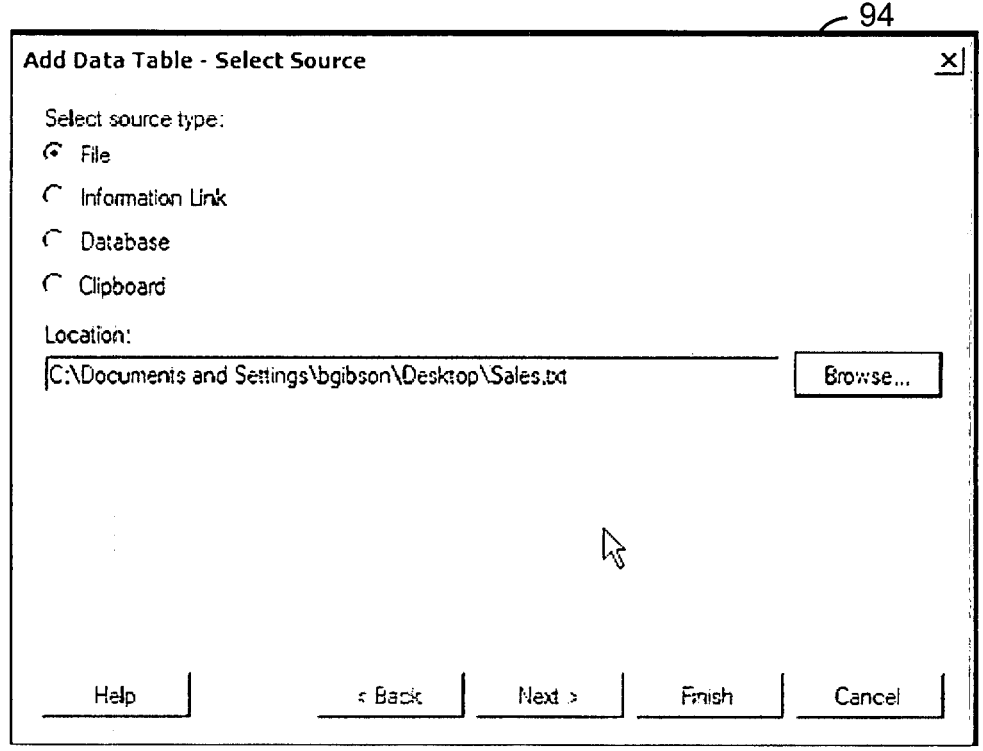
FIG. 7 is a screenshot of the add data table dialog for the system of FIG. 1 after a data table location has been selected.

Referring to FIG. 6, actuating the "Next" button causes the visualization application to present an import settings dialog 96. Although the system includes logic to detect data formats, this dialog allows the user to override it and specify a particular data format. After completing this screen, the user is returned to the add table dialog 94 (see FIG. 7).

Figure 8:
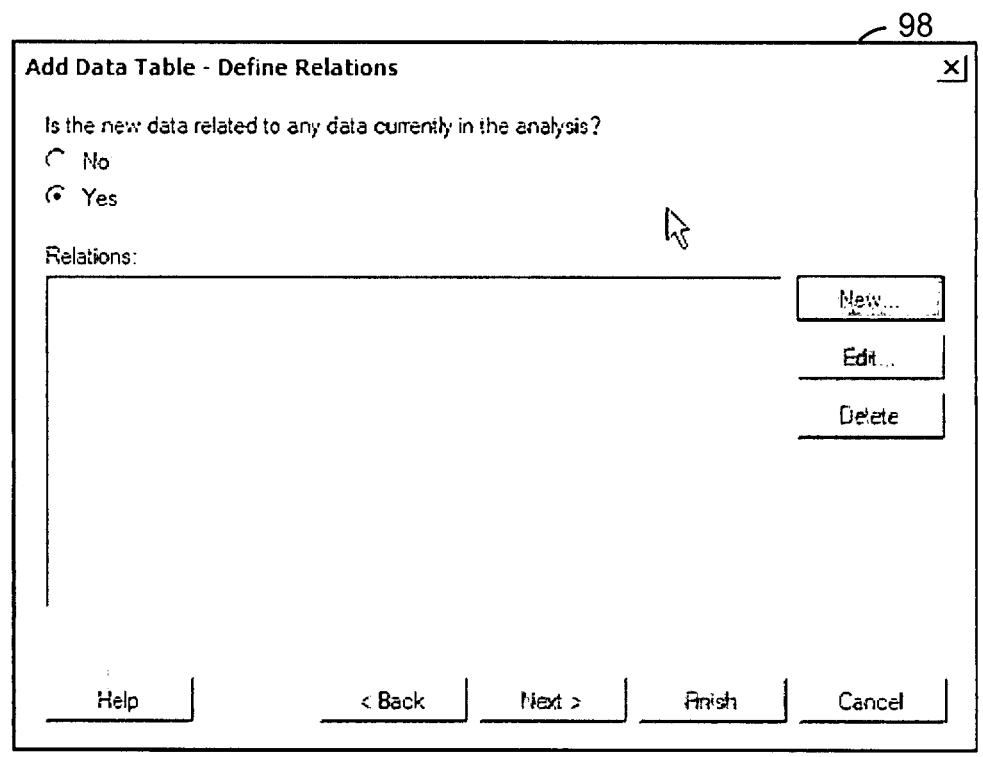
FIG. 8 is a screenshot of a relation definition dialog for the system of FIG. 1.
Figure 11:
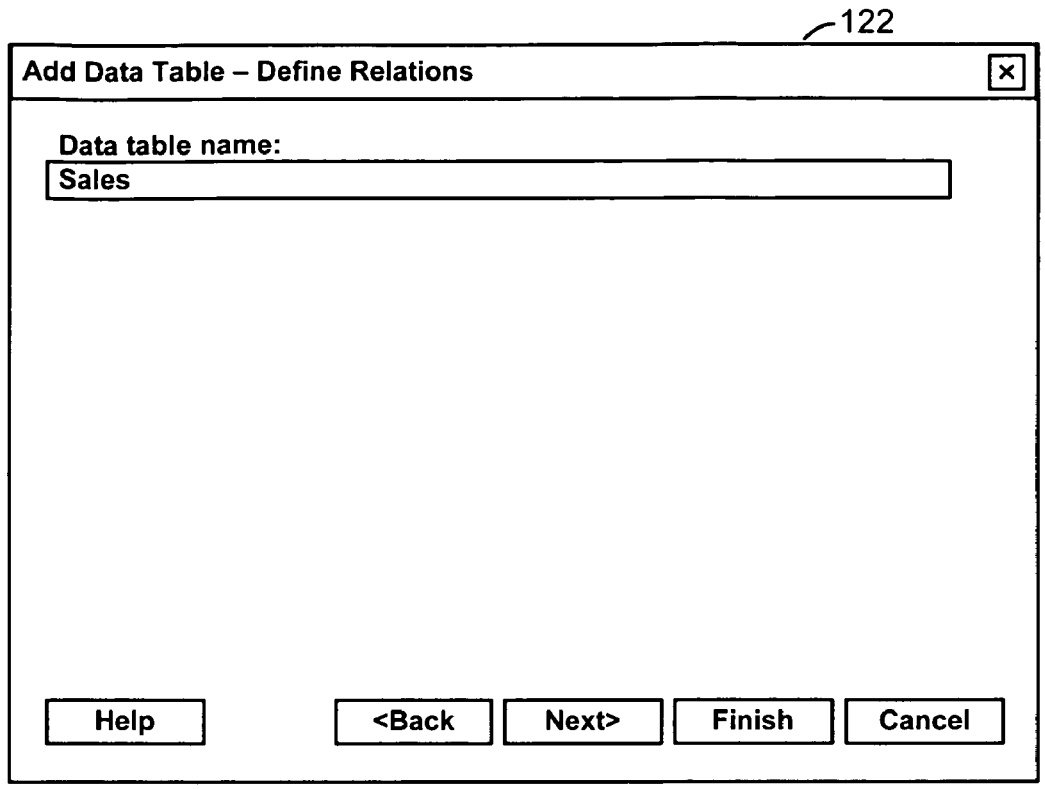
FIG. 11 is a screenshot of an add data table—name dialog for the system of FIG. 1.

Referring to FIG. 8, again actuating "Next" brings the user to a relations definition dialog 98. This dialog includes yes and no radio buttons. Selecting the no radio button brings the user to an add data table name dialog 104 (see FIG. 11). This dialog includes a text box that allows the user to give the second table a name that will be used in visualizations.

Figure 9:
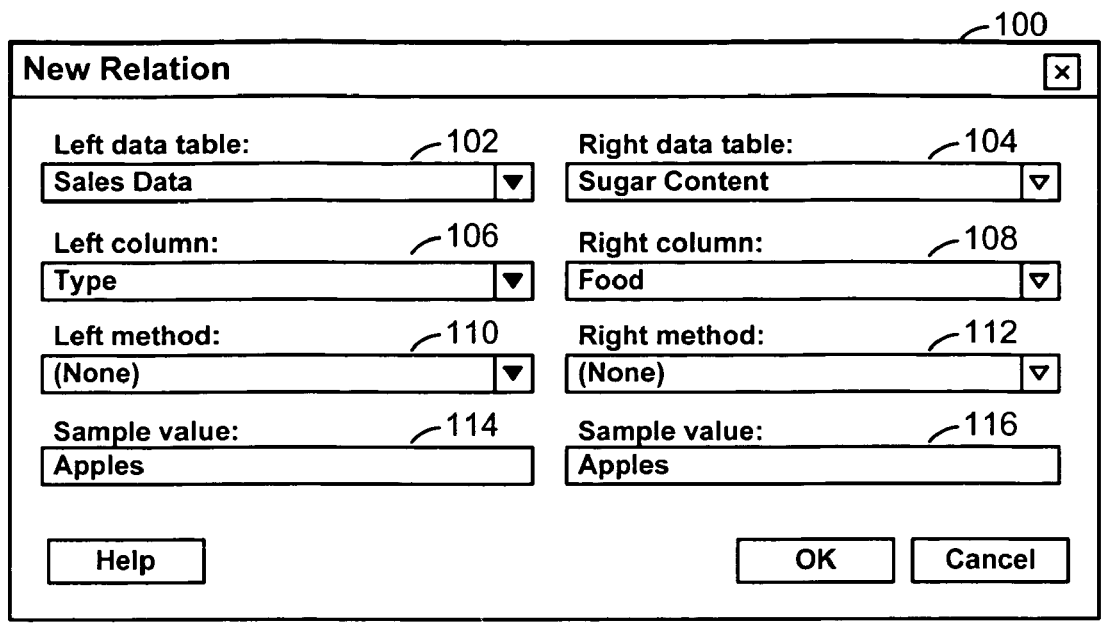
FIG. 9 is a screenshot of a new relation dialog for the system of FIG. 1.

Referring to FIG. 9, selecting the yes radio button in the relations definition dialog 98 brings the user to a new relations dialog 100. This dialog includes two pick lists 102, 104 for selecting the tables for which a relationship is to be defined. Below each of these pick lists is a column identifier pick list (106, 108) that allows the user to select a column for each of the chosen tables. These selections indicate to the system that the chosen columns are related.

Below each of the column identifier pick lists (106, 108) is a format pick list (110, 112) that allows the user to specify simple formatting operations to be applied to the data. These formatting operations allow data sets that are formatted differently to be more compatible. In the case of alphanumeric data, for example, the data in one column might be converted from lowercase to uppercase to match the existing data in another column. The options available depend on the type of data in the data sets, and sample data text boxes 114, 116 placed below the format pick lists help the user to see that a formatting issue might exist. The system can also perform some types of formatting operations automatically.

Figure 10:
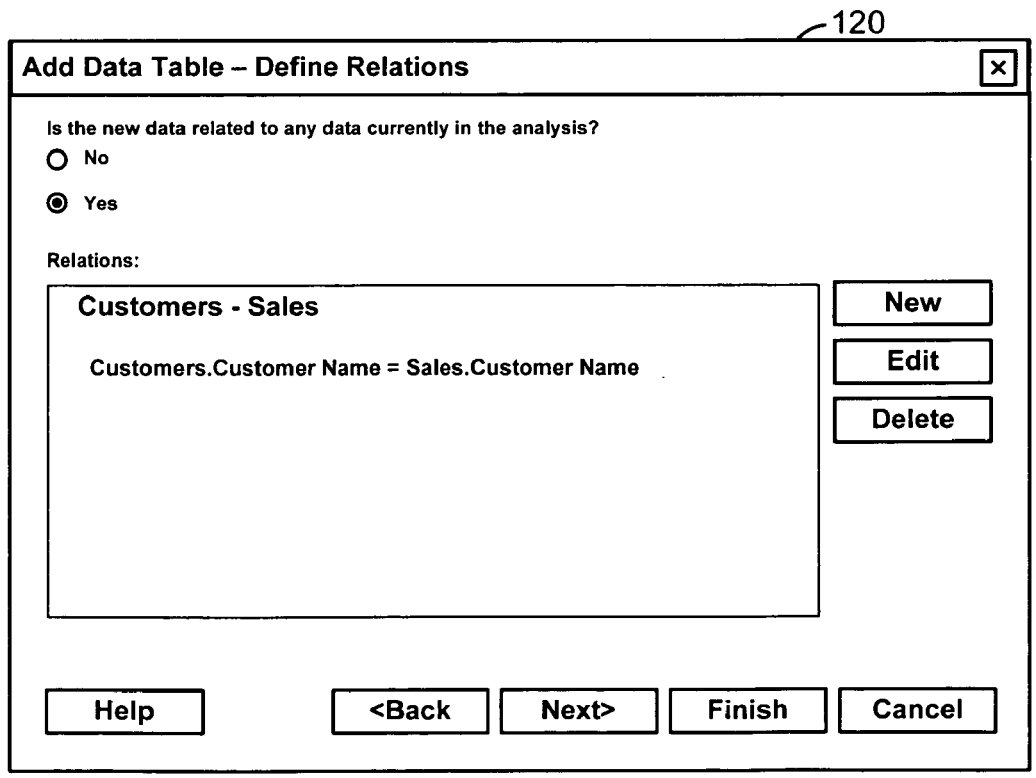
FIG. 10 is a screenshot of the relation definition dialog for the system of FIG. 1 shown after a relation has been defined.

Referring to FIG. 10, actuating an OK button on the new relations dialog returns the user to the relations definition dialog 98, which now displays the data relationship. It should be noted that the user can define multiple relationships between two or more data sets. Relationships can also be defined after the process of adding a table is complete, through the use of a menu entry.

Referring to FIG. 11, again actuating "Next" brings the user to the add data table name dialog 122. As mentioned above, this dialog includes a text box that allows the user to give the second table a name that will be used in the visualizations. The user can then click a finish button, and the system will retrieve and display the visualization.

In this embodiment, the visualization application uses data table objects to manage the multiple tables. Each time a new table is added, a new instance of the data table object type is created. This object instance is then used by the visualization application to access the table until it is no longer needed.

Figure 12:
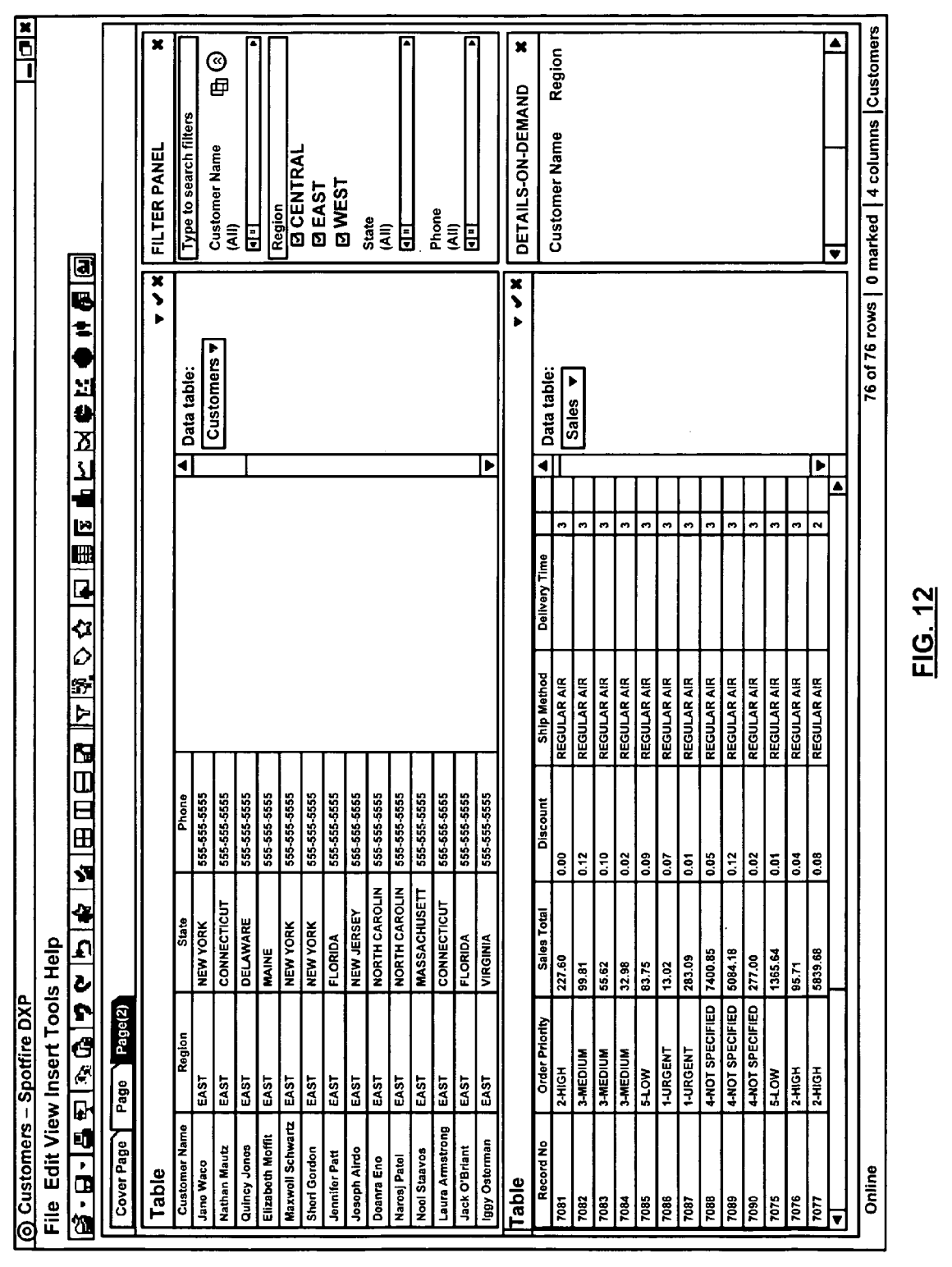

Referring to FIG. 12, the two tables are shown in two panels of a single visualization window with a common set of query devices. Each table includes a data table selector pick list control allowing the user to select which table appears in the panel. A status bar at the bottom of the window will show information about the table that has focus (i.e., the active table).

The filters from one data table are grouped within a single data table group, which can be expanded or collapsed in the filter panel. Filters belonging to the same data table are marked with the same color stripe. The color used for the filters is identical to the color of visualizations that use the same data table. Only the filters belonging to the data table used by the active visualization or any related data table show their true color. Other filters have a gray color stripe. This is independent of how filtering in related data tables has been specified (i.e., whether the filtering in related data tables affects the filtering in another data table or not). If two data tables are related, they will have the same color in the filter panel. Users can change the relations color for all related data tables by selecting a different color from a drop-down list.

Figure 13:
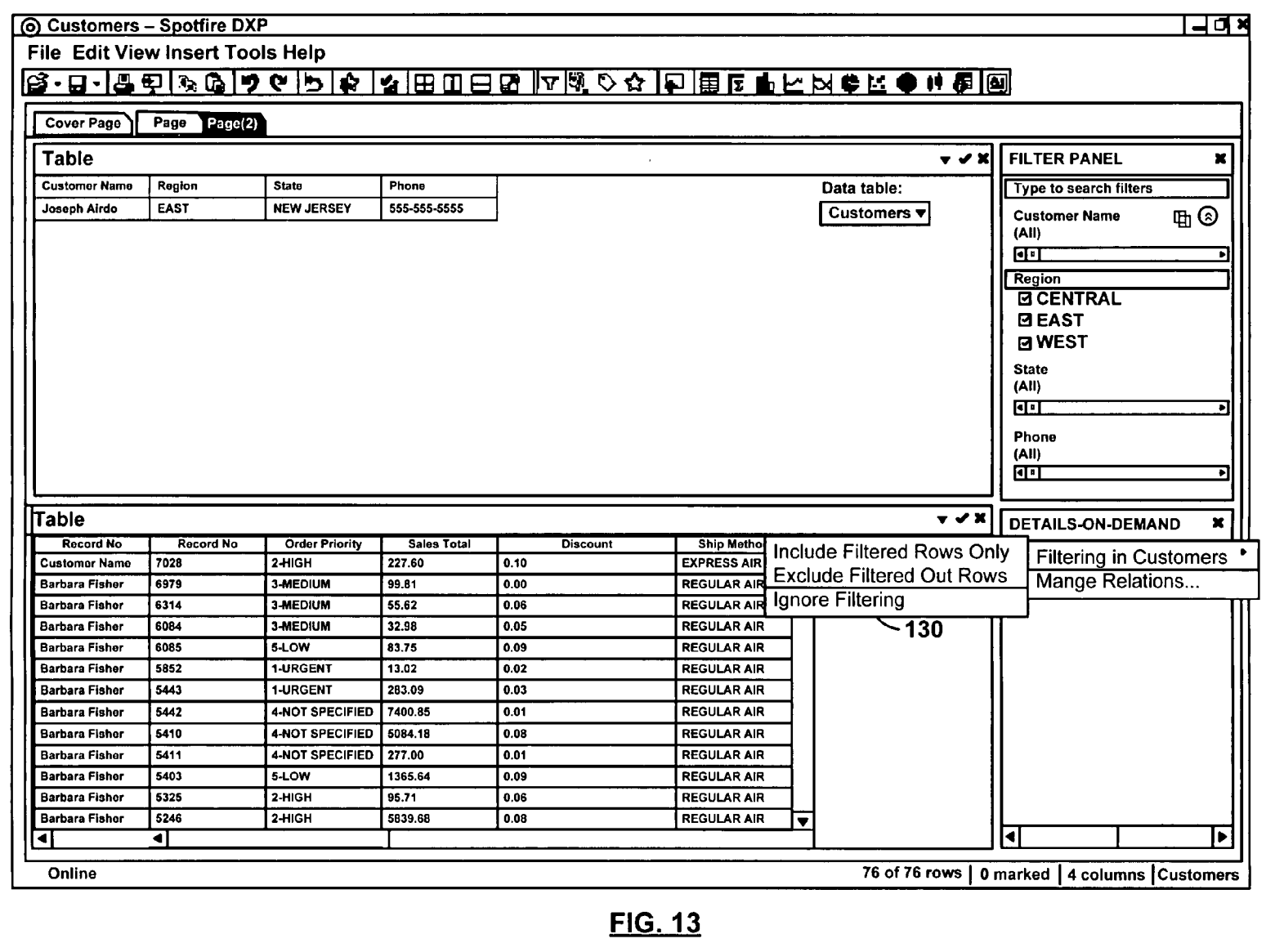

If no relationships have been defined, the filters will operate to limit records shown in their respective tables. If one or more relationships has been defined, there are three ways that filtering can affect a data table. The method used is specified by selecting a drop-down menu 130 on the data table header for the data table of interest in the filter panel (see FIG. 13). This drop-down menu includes three options: include filtered rows only, exclude filtered out rows, and ignore filtering. Where there are multiple relationships, the user can specify how each table should respond to filtering in all other related tables separately.

Figure 14:
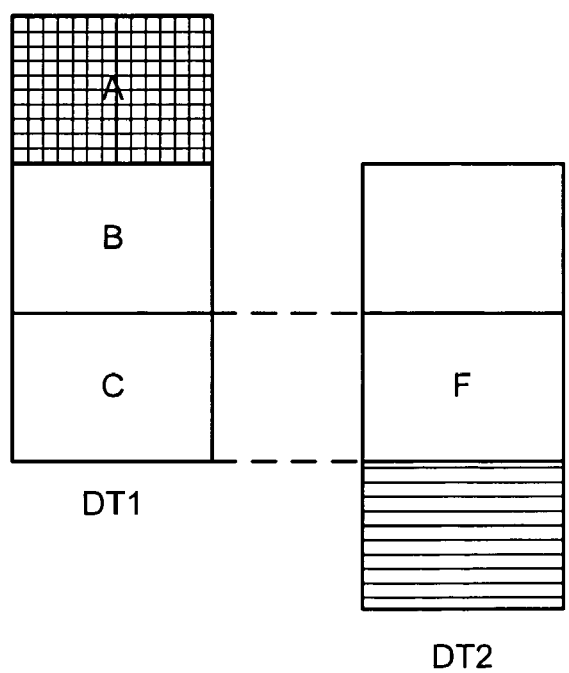
FIG. 14 is a block diagram illustrating relationships between data in two illustrative data sets.

Referring to FIG. 14, the use of different filtering effect types will now be discussed in more detail in connection with an example with two related data tables, DT1 and DT2. Both DT1 and DT2 contain rows that are not available in the other data table (checkered and striped), but they also contain common rows (solid), as listed below:

A=Rows in DT1 that are not available in DT2.
B=Rows in DT1 that are available in DT2, but have been filtered out.
C=Rows in DT1 that are available in DT2 and included in the currently filtered rows of DT2.
F=The filtered rows (rows remaining after filtering) in DT2.
When the filtering management for DT2 is specified (from the DT1 data table header) the different options will give the following results:

Include Filtered Rows Only

The first option will make all rows that are only present in DT1 disappear from the visualizations using DT1, since only the rows that are currently filtered in DT2 will be included. Hence, this option keeps only those rows that are present in both data tables (and have not been filtered out). In the example presented above, this means that only the rows in C will remain after filtering in DT2.

Exclude Filtered Out Rows

The second option will remove those rows that have been filtered out from DT2 from all visualizations using DT1. Hence, this option keeps those rows that are filtered in DT2 as well as the additional rows from DT1. In the example presented above, this means that A and C will remain after filtering in DT2.

Ignore Filtering

The third option is to ignore any filtering done in the related data table completely. This way, all rows that are available in the current data table will remain available. In the example presented above, this means that A, B and C will all remain after filtering in DT2.

Filtering affects the inclusion of records in data tables in a visualization window page, but it also affects visualizations that are based on that table. Selecting sales records with only the eastern region, for example, will make graphs associated with the sales records only show data points for the eastern region. And the filtering may also show up in visualizations for related tables if the filtering effect type is not set to ignore. If customer data table is filtered to show only customers from the eastern region, the customer columns are related, and the filtering effect type is set to include, for example, then the sales table will only show sales for the customers who are not filtered out (i.e., sales made to customers in the east).

Figure 15:
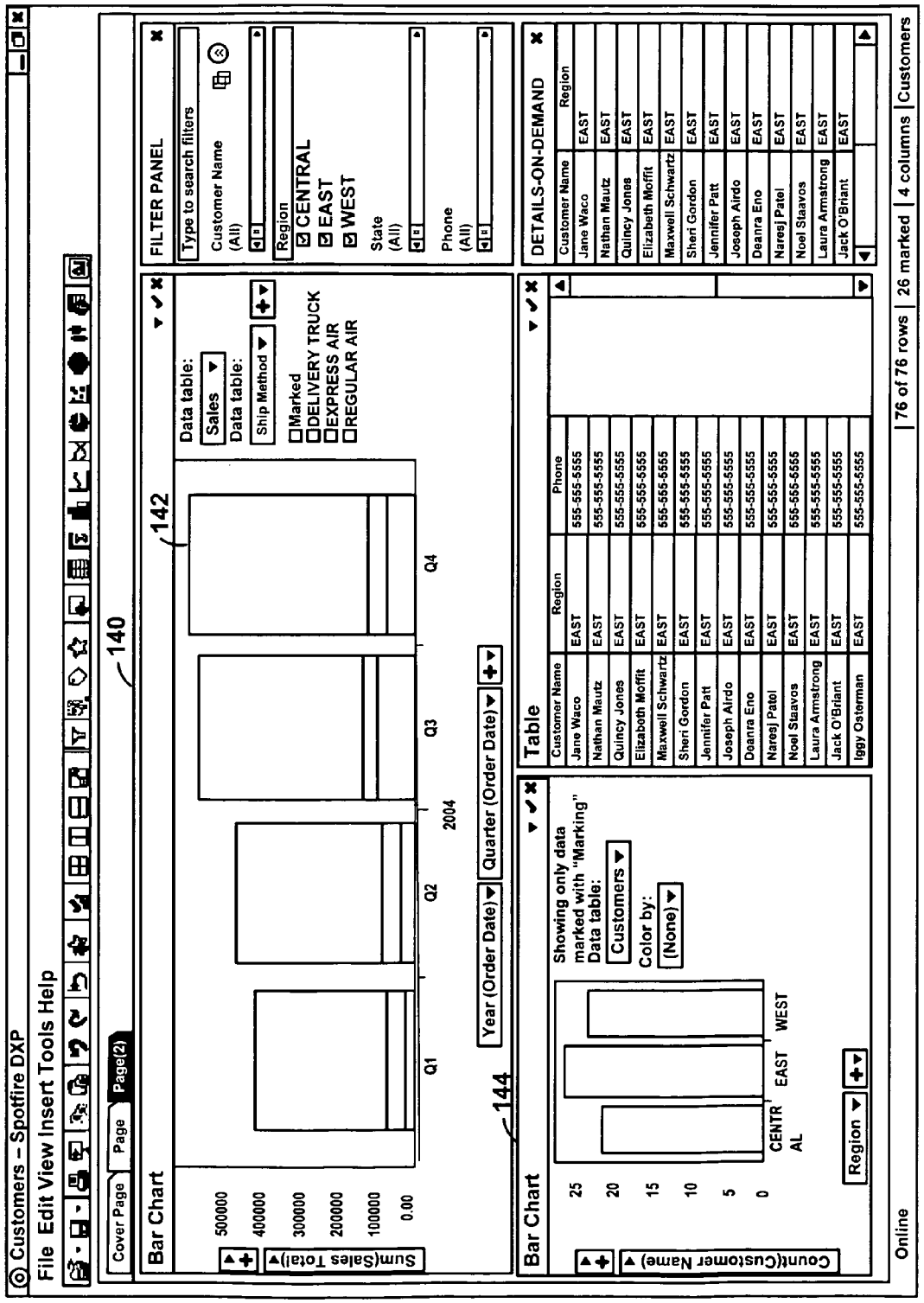
FIG. 15 is a screenshot of the visualization screen for the system of FIG. 1 showing a marked bar charts for a sales table and a bar chart for a related customer table.

Referring to FIG. 15, relations between tables can be used to answer detailed questions by linking visualizations. Allowing a user to mark a component area 142 of a bar chart 140 for a sales table can then be used to restrict the data shown in another bar chart 144 for the customer table. In the example shown in FIG. 14, the user has marked a portion of a sales bar chart that corresponds to regular air shipments in the fourth quarter of 2004. The customers corresponding to just these marked records can then be broken down further in another bar chart for the customer table. Numerous other types of visualizations could also be defined and manipulated, such as scatter plots (two- and three-dimensional), pie charts, line charts, parallel coordinate plots, heat maps, tree maps, box plots, and cross tables (some times called pivot tables).

The user can also save one or more visualization pages that access more than one data set. This visualization can then be easily accessed again by the same or another user, who does not need to go out and search for or consolidate disparate data sets. The system can save visualization pages that include references to the data sets, or it can consolidate and save the data sets as well.

The system described above has been implemented using a special-purpose software program running on a general-purpose computer platform, but it could also be implemented in whole or in part using special-purpose hardware. In addition, while the system can be broken into the series of modules shown in FIG. 2, one of ordinary skill in the art would recognize that it is also possible to combine them and/or split them to achieve a different breakdown. And while the present embodiment shows tables, filters and/or visualizations in panels of a same visualization page, it is also possible to use other spatial organization schemes, such separate floating windows for all visualization elements. It should be noted as well that the system described in this application can open multiple visualization windows that each include pages that operate on more than one data table.

The present invention has now been described in connection with a number of specific embodiments thereof. However, numerous modifications which are contemplated as falling within the scope of the present invention should now be apparent to those skilled in the art. For example, while records are generally treated as rows with fields organized in columns, other systems might organize data in other ways. It is therefore intended that the scope of the present invention be limited only by the scope of the claims appended hereto. In addition, the order of presentation of the claims should not be construed to limit the scope of any particular term in the claims.

What is claimed is:

1. A data visualization system, comprising:
   multi-source record access logic operative to:
   access records belonging to a first data source including a first set of data fields, and
   access records belonging to a second data source including a second set of data fields,
   query device presentation logic operative to present a plurality of query devices that are responsive to user interaction with a pointing device and that correspond to fields from the first set and fields from the second set, wherein at least one of the query devices is a common query device that is operative to filter data from both the first data source and the second data source,
   combined visualization logic operative to display one or more visualizations corresponding to records accessed in the first data source and in the second data source, wherein the one or more visualizations are responsive to filtering functions defined by the at least one common query device to update the visualizations, and wherein different movements of the pointing device result in different changes to a corresponding filtering function,
   wherein the query device presentation logic and the combined visualization logic are operative to display visualizations from the first and second data sources when they are each located in different places while allowing the first data source and the second data source to remain at the different places,
   wherein the query device presentation logic and the combined visualization logic are operative to display visualizations from the first and second data sources when they are each formatted with different formats without requiring the user to reformat either the first data source or the second data source, and
   common record association logic operative to associate one or more fields in the first data source with one or more fields in the second data source.

2. The system of claim 1 wherein the combined visualization logic is responsive to a mode selection to select different methods of filtering data for common fields associated by the common record association logic.

3. The system of claim 2 wherein the different methods of filtering include exclude filtered out rows, include filtered rows only, and ignore filtering.

4. The system of claim 1 wherein the record association logic is operative to present an association control to the user in response to a user request to open more than one data source for a single visualization.

5. The system of claim 1 wherein the multi-source record access logic, query device presentation logic, and combined visualization logic are operative to present a plurality of different grouped visualizations that each operate on different sets of two or more different data sources.

6. The system of claim 1 wherein the combined visualization logic is operative to display the tables and visualizations in a single unified presentation area.

7. The system of claim 1 wherein the combined visualization logic is operative to present a data source selection control associated with the visualizations.

8. The system of claim 1 in which the combined visualization logic is operative to display one or more interactive elements in one visualization that are responsive to user interaction to affect the display of one or more visual elements in another visualization.

9. The system of claim 1 further including save logic operative to save the visualizations.

10. The system of claim 1 further including record consolidation logic operative to consolidate records from the first data source with records from the second data source.

11. The system of claim 1 wherein the multi-source record access logic is operative to present a source addition control to the user.

12. The system of claim 1 wherein the visualizations for associated tables are controlled by a same set of grouped query devices.

13. The system of claim 1 further including network browsing logic responsive to user input to select at least one remote network file address on a computer network and wherein the multi-source record access logic is operative to access at least one of the first and second data sources at the user-selected remote network file address through the computer network.

14. The system of claim 1 wherein the combined visualization logic is operative to display a common visualization for data from the first and second tables and to update the common visualization to reflect updated filtering for both the first and second tables.

15. The system of claim 1 wherein the query device presentation logic is operative to present query devices that include sliders responsive to a pointing device.

16. A data visualization method, comprising:
retrieving data from a plurality of different data tables,
providing to a user a data table association control,
associating in response to input from the user through the data table association control at least a first and a second of the data tables based on a selection of at least one common field between the first and second tables,
displaying to the user one or more visualizations for data from both the first and second tables,
providing to the user at least one common query device that is responsive to user input from a pointing device to filter data from both the first and second tables,
sensing adjustment by the user of the at least one common query device using a pointing device,
updating the filtering of data from both the first and second tables in response to the adjustment of the at least one common query device by the user using a pointing device, wherein different movements of the pointing device result in different changes to a corresponding filtering of data, and
updating the one or more displayed visualizations in response to the step of filtering to display one or more updated visualizations reflecting the updated filtering for both the first and second tables, wherein step of updating the one or more displayed visualizations updates the displayed visualizations for the first and second data tables when they are each located in different places while allowing the first data source and the second data source to remain at the different places, and wherein step of updating the one or more displayed visualizations updates the displayed visualizations for the first and second data tables when they are each formatted with different formats without requiring the user to reformat either the first data source or the second data source.

17. The method of claim 16 wherein the step of displaying displays a common visualization for data from the first and second tables and wherein the step of updating updates the common visualization to reflect updated filtering for both the first and second tables.

18. The method of claim 16 further including the step of responding to a user selection of a network location to retrieve data from at least one of the tables.

19. The method of claim 16 further including the step of consolidating data from the first and second data tables after the step of updating.

20. The method of claim 16 further including the step of receiving a formatting operation selection from the user for one of the first and second tables and formatting data retrieved from that table based on the received selection.

21. The system of claim 16 wherein the step of sensing adjustments senses adjustments to a slider by a pointing device.

* * * * *